US012626728B2

(12) United States Patent
Zou et al.

(10) Patent No.: US 12,626,728 B2
(45) Date of Patent: May 12, 2026

(54) METHOD AND DEVICE FOR TIMING ALIGNMENT OF AUDIO SIGNALS

(71) Applicant: Goertek Inc., Weifang (CN)

(72) Inventors: Libing Zou, Weifang (CN); Yifan Zhang, Weifang (CN); Xueqiang Wang, Weifang (CN); Fuqiang Zhang, Weifang (CN)

(73) Assignee: Goertek Inc., Weifang (CN)

( * ) Notice: Subject to any disclaimer, the term of this patent is extended or adjusted under 35 U.S.C. 154(b) by 350 days.

(21) Appl. No.: 18/266,401

(22) PCT Filed: Oct. 20, 2021

(86) PCT No.: PCT/CN2021/124876
§ 371 (c)(1),
(2) Date: Jun. 9, 2023

(87) PCT Pub. No.: WO2022/121521
PCT Pub. Date: Jun. 16, 2022

(65) Prior Publication Data
US 2024/0038278 A1      Feb. 1, 2024

(30) Foreign Application Priority Data

Dec. 9, 2020    (CN) .......................... 202011447392.8

(51) Int. Cl.
*G11B 27/34*       (2006.01)
*G06T 7/33*        (2017.01)
*G11B 27/031*      (2006.01)

(52) U.S. Cl.
CPC .............. *G11B 27/34* (2013.01); *G06T 7/337* (2017.01); *G11B 27/031* (2013.01);
(Continued)

(58) Field of Classification Search
CPC ....... G11B 27/34; G11B 27/031; G06T 7/337; G06T 2207/20056; G06T 2207/20081;
(Continued)

(56) References Cited

FOREIGN PATENT DOCUMENTS

CN          108564940 A  *  9/2018  ............. G10L 15/02
WO    WO-2013088208 A1  *  6/2013  ....... H04N 21/43072

OTHER PUBLICATIONS

Thomas Vassalo, "Calculating Audio Song Similarity Using Siamese Neural Networks" by Thomas Vassalo, Aug. 28, 2020, towards data science; pp. 1-15 (Year: 2020).*

* cited by examiner

*Primary Examiner* — Carolyn R Edwards
(74) *Attorney, Agent, or Firm* — Baker Botts LLP

(57) ABSTRACT

A method and device for timing alignment of audio signals. The method includes: generating frequency domain images respectively for an audio signal to be aligned and a template audio signal (S110); inputting the frequency domain images into a twin neural network of a timing offset prediction model respectively, to obtain two frequency domain features output by the twin neural network (S120); fusing the two frequency domain features to obtain a fused feature (S130); inputting the fused features into a prediction network of the timing offset prediction model to obtain a timing offset output by the prediction network (S140); and performing timing alignment processing on the audio signal to be aligned according to the timing offset (S150). The technical solution is more robust, and especially in a noisy environment, features extracted by a deep neural network are more intrinsic and more stable. An end-to-end timing offset prediction model is more accurate and faster.

15 Claims, 4 Drawing Sheets

(52) U.S. Cl.
CPC .............. *G06T 2207/20056* (2013.01); *G06T 2207/20081* (2013.01); *G06T 2207/20084* (2013.01); *G06T 2207/20221* (2013.01)

(58) Field of Classification Search
CPC . G06T 2207/20084; G06T 2207/20221; Y02P 90/30; G06N 3/045; G06N 3/08; G10L 21/0216; G06F 18/253
See application file for complete search history.

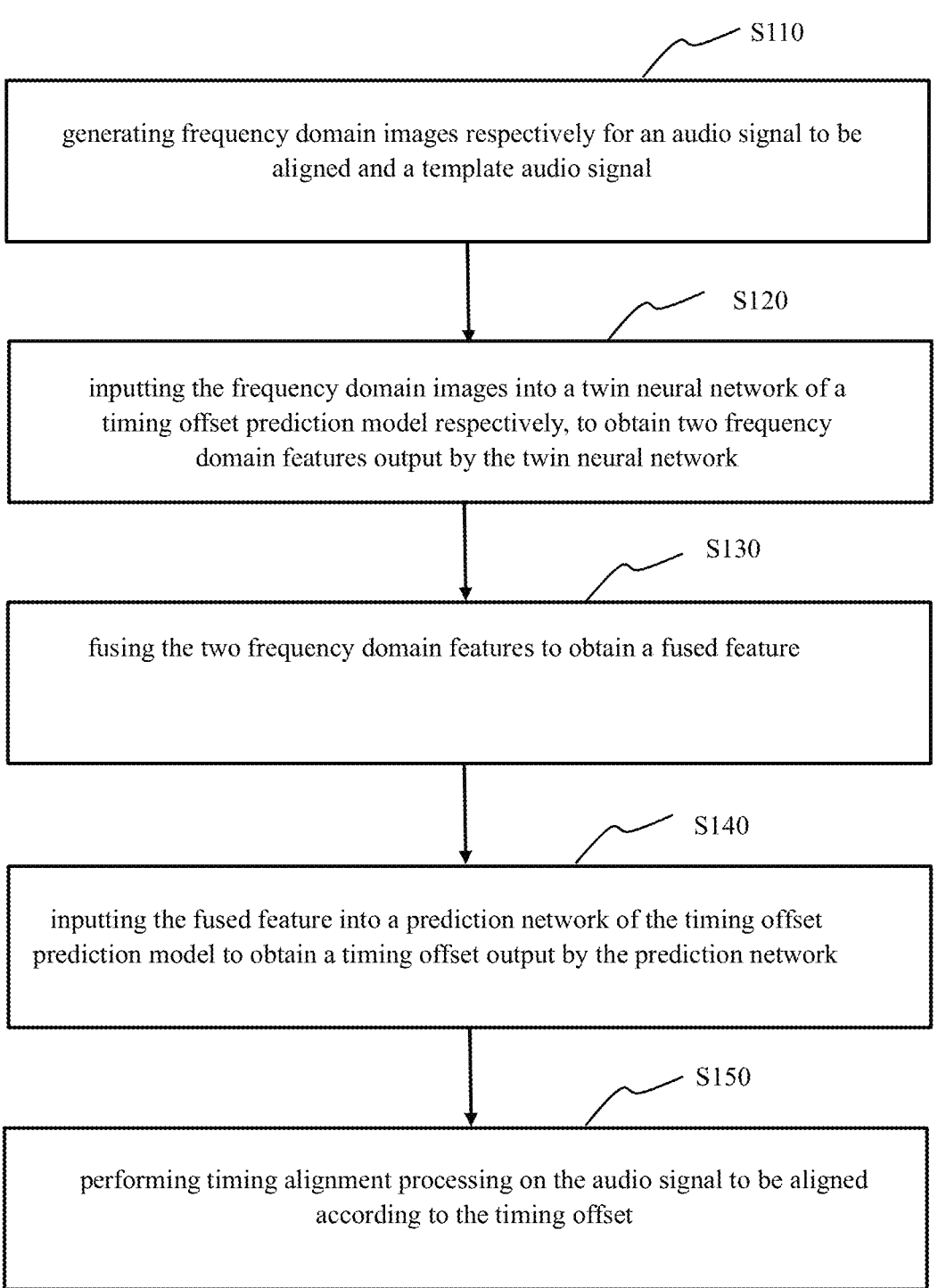

S110 generating frequency domain images respectively for an audio signal to be aligned and a template audio signal

S120 inputting the frequency domain images into a twin neural network of a timing offset prediction model respectively, to obtain two frequency domain features output by the twin neural network

S130 fusing the two frequency domain features to obtain a fused feature

S140 inputting the fused feature into a prediction network of the timing offset prediction model to obtain a timing offset output by the prediction network

S150 performing timing alignment processing on the audio signal to be aligned according to the timing offset

METHOD AND DEVICE FOR TIMING ALIGNMENT OF AUDIO SIGNALS

CROSS-REFERENCE TO RELATED APPLICATIONS

This application is a National Stage of International Application No. PCT/CN2021/124876, filed on Oct. 20, 2021, which claims priority to Chinese Patent Application No. 202011447392.8 filed on Dec. 9, 2020, both of which are hereby incorporated by reference in their entireties.

TECHNICAL FIELD

The present application relates to the technical field of audio signal processing, and in particular to a method and device for timing alignment of audio signals.

BACKGROUND

In the process of industrial production, by analyzing whether an audio signal generated by a production apparatus is abnormal, failure of the apparatus can be discovered in time to avoid accidents. For example, in the process of railway transportation, by detecting abnormal sound of a wheel and a track during operating, damage to the track or wheel can be discovered in time, so that the damaged apparatus can be replaced in time to avoid accidents of wheels during operating.

In addition, in the production process of an acoustic apparatus, by playing specific sound signals of different frequency bands, it is possible to analyze and determine whether the acoustic apparatus is faulty, and analyze the frequency band and time in which the fault occurs, so as to improve the production process and improve the overall quality of products.

Generally, a section of an audio signal sequence generated by an apparatus under inspection is acquired, and compared with a standard signal sequence, a position where an abnormal signal is generated can be determined. However, due to reasons of an acquisition apparatus or operation, a timing of a signal acquired by the apparatus usually does not match with a timing of an original signal, so it is necessary to align the acquired signal sequence with the standard signal sequence to facilitate subsequent further processes.

SUMMARY

The present application provide a method and device for timing alignment of audio signals, so as to use the powerful feature expression capability of deep neural networks to filter noise signals, and finally achieve end-to-end timing alignment of audio signals.

The embodiment of the application uses the following technical solutions.

In a first aspect, an embodiment of the present application provides a method for timing alignment of audio signals, including: generating frequency domain images respectively for an audio signal to be aligned and a template audio signal; inputting the frequency domain images into a twin neural network of a timing offset prediction model respectively, to obtain two frequency domain features output by the twin neural network; fusing the two frequency domain features to obtain a fused feature; inputting the fused feature into a prediction network of the timing offset prediction model to obtain a timing offset output by the prediction network; and performing timing alignment processing on the audio signal to be aligned according to the timing offset.

In a second aspect, the embodiment of the present application also provides device for timing alignment of audio signals including:

an image generating unit, configured to generate frequency domain images for an audio signal to be aligned and a template audio signal respectively;

a predicting unit, configured to input the frequency domain image into a twin neural network of a timing offset prediction model respectively, to obtain two frequency domain features output by the twin neural network; fuse the two frequency domain features to obtain a fused feature; and input the fused feature to a prediction network of the timing offset prediction model to obtain a timing offset output by the prediction network; and an aligning unit, configured to perform timing alignment processing on the audio signal to be aligned according to the timing offset.

In a third aspect, the embodiment of the present application also provides an electronic apparatus, including: a processor; and a memory arranged to store computer-executable instructions, and when executed, the executable instructions enable the processor to perform the above method for timing alignment of audio signals.

In a fourth aspect, the embodiment of the present application also provides a computer-readable storage medium, the computer-readable storage medium stores one or more programs, and when the one or more programs are executed by an electronic apparatus including a plurality of applications, the electronic apparatus executes the above method for timing alignment of audio signals.

The above-mentioned at least one technical solution adopted in the embodiments of the present application can achieve the following beneficial effects: extracting features from frequency domain images of an audio signal to be aligned and a template audio signal by using a deep neural network, compared with the traditional artificial feature method, better robust can be obtained, and especially in a noisy environment, the features extracted by the deep neural network are more intrinsic and more stable. The timing offset prediction model is an end-to-end model, which can directly predict the timing offset. Compared with algorithms such as MAD, SSDA, the sensitivity of noise is smaller, the matching accuracy is higher, and the speed is faster.

BRIEF DESCRIPTION OF THE DRAWINGS

The drawings described here are used to provide a further understanding of the present application and constitute a part of the present application. The schematic embodiments and illustration of the present application are used to explain the present application and do not constitute an improper limitation to the present application. In the accompanying drawings:

FIG. 1 is a schematic flow chart of a method for timing alignment of audio signals according to an embodiment of the present application;

DETAILED DESCRIPTION

Figure 2:
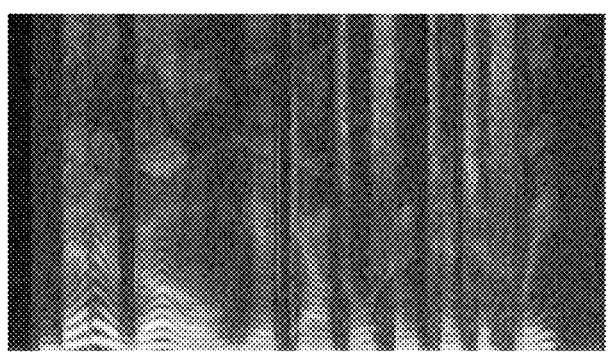
FIG. 2 shows a frequency domain image generated according to an embodiment of the present application.

In order to make the purposes, technical solutions and advantages of the present application clearer, the technical solutions of the present application will be clearly and completely described below in conjunction with specific embodiments of the present application and corresponding drawings. Apparently, the described embodiments are only part of the embodiments of the present application, rather than all the embodiments. Based on the embodiments in the present application, all other embodiments obtained by persons of ordinary skill in the art without making creative efforts belong to the scope of the present application.

The inventors have found that the timing alignment of audio signals can be achieved by using the moving delay value, middle alignment method, and feature point matching method, however, these methods do not work well when there are a large amount of noise signals, since the noise signals are random and diverse.

Therefore, the inventors think of using the powerful feature expression ability of the neural network to filter noise signals, and finally realize the timing alignment of end-to-end audio signals.

The technical solutions provided in various embodiments of the present application will be described in detail below in conjunction with the accompanying drawings.

FIG. 1 is a schematic flow chart of a method for timing alignment of audio signals according to an embodiment of the present application. As shown in FIG. 1, the method includes:

Step S110, generating frequency domain images for an audio signal to be aligned and a template audio signal, respectively.

Wherein, the audio signal to be aligned may be an audio signal acquired by a recording apparatus. For example, the audio signal to be aligned may be an audio signal generated by a product under test. Then correspondingly, the template audio signal can be prepared in advance.

For example, the tested product is a mobile phone, the mobile phone can be used to play a section of a template audio in mp3 format (to determine the template audio signal), and the audio signal generated by the actual playback of the mobile phone is acquired as the audio signal to be aligned.

The embodiment of the present application does not directly input the audio signal into a timing offset prediction model, but generates a frequency domain image corresponding to the audio signal as input of the timing offset prediction model. This can effectively utilize the technical foundation of deep neural networks in the field of image recognition. Moreover, the frequency domain images are selected instead of time domain images. On one hand, duration of the audio signal is not constant. If time domain images are used, sizes of the images cannot be controlled, which is disadvantageous to subsequent input into the timing offset prediction model for processing. On the other hand, information that can be expressed by frequency domain images is different from that of time domain images. After experiments, it has better effects in feature expression.

Step S120, the frequency domain images are input into a twin neural network of the timing offset prediction model respectively, and obtain two frequency domain features output by the twin neural network.

Wherein, the timing offset prediction model is an end-to-end model, including a twin neural network and a prediction network. A twin neural network (TNN), also called siamese neural networks, is a coupled architecture based on two deep neural networks. The twin neural network takes two samples as input, and outputs a representation embedded in a high-dimensional space, so as to compare the similarity of the two samples.

In an embodiment of the present application, parameters of the two deep neural networks used by the twin neural network are shared, and it can be considered that the two deep neural networks are completely identical. That is to say, if a frequency domain image is respectively input into the two deep neural networks, two frequency domain features obtained are the same. The deep neural networks used in the twin neural network can be tailored based on convolutional neural networks such as Residual Network (ResNet) or VGG16 as the backbone network. The embodiment of the present application does not limit a specific number of layers and a specific composition of each layer.

Therefore, in the embodiment of the present application, the frequency domain image of the audio signal to be aligned and the frequency domain image of the template audio signal are respectively input into the twin neural network. The order is not limited and is optional.

Step S130, fusing two frequency domain features to obtain a fused feature. In this way, feature representation of the two audio signals is obtained.

Step S140, inputting the fused feature into a prediction network of the timing offset prediction model, and obtaining a timing offset output by the prediction network.

From step S120 to step S140, it can be seen that the frequency domain images are input into the timing offset prediction model to obtain the timing offset output by the timing offset prediction model, thereby realizing end-to-end timing offset prediction.

Step S150, performing timing alignment processing on the audio signal to be aligned according to the timing offset.

It can be seen that the method shown in FIG. 1 uses a deep neural network to extract features from the frequency domain images of the audio signal to be aligned and the template audio signal. Compared with traditional artificial feature method, the method shown in FIG. 1 is more robust. Especially in multi-noise environment, the features extracted by the deep neural network are more intrinsic and more stable. The timing offset prediction model is an end-to-end model, which can directly predict the timing offset. Compared with mean absolute difference (MAD) algorithm and sequential similarity detection algorithm (SSDA), the method shown in FIG. 1 is less sensitive to noise, and has higher matching accuracy and faster speed.

In some embodiments, in the above method, generating frequency domain images for an audio signal to be aligned and a template audio signal respectively includes: cutting the audio signal to be aligned according to the duration of the template audio signal, so that the duration of the audio signal to be aligned after cutting equals to the duration of the template audio signal; and frequency domain images are respectively generated for the audio signal to be aligned after cutting and the template audio signal.

When the length (time) of the audio signal to be aligned is inconsistent with the length of the template audio signal, the audio signal to be aligned needs to be cut according to the length of the template audio signal. Cutting can be done by using one of the head, middle, and tail alignment method, which can be determined according to requirements of the application. After cutting, the length of the audio signal to be aligned is the same as that of the template audio signal.

In some embodiments, in the above method, generating frequency domain images for an audio signal to be aligned and a template audio signal respectively includes: generating frequency domain images for the audio signal to be aligned and the template audio signal respectively by using a Fast Fourier Transform (FFT) method.

The basic principle of Fast Fourier Transform is to decompose an original N-point sequence into a series of short sequences sequentially. FIG. 2 shows a frequency domain image generated according to an embodiment of the present application, wherein the horizontal axis represents time, the vertical axis represents frequency spectrum, and the color represents the amplitude of a signal.

In some embodiments, in the above method, fusing two frequency domain features to obtain a fused feature includes: concatenating the two frequency domain features to obtain the fused feature; and performing timing alignment processing on the audio signal to be aligned according to the timing offset includes: determining a way of using the timing offset according to an order of the two frequency domain features during concatenating.

By concatenating two frequency domain features ("concat" operation), the two frequency domain features can be connected to obtain a feature, that is, a fused feature. According to the different concatenating orders of the two frequency domain features, the timing offsets obtained are also different, and accordingly the usage modes are different.

For example, if the frequency domain feature of the audio signal to be aligned is placed first, it is predicted that the audio signal to be aligned has a delay of 1 second relative to the template audio signal (the timing offset is −1), and the timing of the audio signal to be aligned needs to be shifted forward by 1 second. If the frequency domain feature of the template audio signal is placed first, it is predicted that the template audio signal is 1 second ahead of the audio signal to be aligned (the timing offset is 1). Although it is also necessary to shift the timing of the audio signal to be aligned forward by 1 second in the same way, it can be seen that the usage modes are different due to the difference in the positive and negative timing offsets.

In some embodiments, in the above method, inputting the fused feature into the prediction network of the timing offset prediction model, to obtain the timing offset output by the prediction network includes: fully connected processing is performed on the fused feature by a fully connected layer (FC) of the prediction network to obtain a fully connected feature; a Flat layer of the prediction network performs flattening processing on the fully connected feature to obtain a flattened one-dimensional feature; and an output layer of the prediction network outputs the predicted timing offset based on the one-dimensional feature.

In a specific embodiment, the number of fully connected layer is preferably 2, that is, fully connected processing are performed twice on the fused feature to obtain the fully-connected feature. Since the image is two-dimensional, and the timing offset is preferably one value, the embodiment of the present application use the Flat layer to flatten the fully connected feature to obtain one-dimensional feature, and then predict output by using an output layer.

In some embodiments, in the above method, the timing offset prediction model is obtained by training in the following manner: a group of training sample images is input into the twin neural network of the timing offset prediction model, to obtain two frequency domain features output by the twin neural network; the two frequency domain features are fused to obtain the fused feature; the fused feature is input into the prediction network of timing offset prediction model, to obtain the timing offset output by the prediction network as a sample predictive value; and a training loss value is calculated according to the sample predictive value and a sample actual value of the group of training sample images, and parameters of the twin neural network and the parameters of the prediction network are updated according to the training loss value.

The group of training sample images includes two frequency domain images, which may be generated from two audio signals. However, in this case, it is necessary to manually mark information (mark the timing offset of the audio signals), and a large number of "control" sample groups are needed. In order to solve this problem, the embodiment of the present application also proposes a training method using online learning.

In some embodiments, the above method further includes: generating a first frequency domain image of a sample signal; processing the first frequency domain image to obtain a second frequency domain image to simulate a signal to be aligned of the sample signal; and using the first domain image and the second frequency domain image as a group of training sample images to perform online learning and training on the timing offset prediction model.

As a result, a large number of training sample images can be generated without manual labeling operations in advance, which overcomes the need for a large number of samples in the supervised learning of deep neural networks.

Specifically, the second frequency domain image obtained by processing the first frequency domain image is used to simulate a frequency domain image of a signal to be aligned, and it is best to be able to simulate various situations that occur in an actual scene.

In some embodiments, in the above method, processing the first frequency domain image includes: performing offset processing on the first frequency domain image, and using the offset used in the offset processing as the sample actual value of the group of training sample images. It can be seen that the embodiment of the present application can only rely on the sample signal, without manual labeling, and realizes automatic labeling. The offset processing can use a random shift operation to simulate the actual situation where the audio signal data to be aligned and the template audio signal have a timing shift. The shift operation can take into account the situation of simulating the actual scene as much as possible, and has diversity. The filling operation after shift can refer to the filling operation of the image.

In some embodiments, in the above method, processing the first frequency domain image includes: adding noise to the first frequency domain image, so as to simulate noise interference in the actual scene.

Therefore, the robustness and stability of the timing offset prediction model in a complex noise environment can be improved. The noise type can be Gaussian white noise, Poisson noise, salt and pepper noise, etc. The diversity of noise can be considered when adding noise. For example, when adding Gaussian white noise, the diversity of noise can be obtained by adjusting the mean value and variance. A specific way of increasing the noise can be implemented with reference to the prior art.

Figure 3:
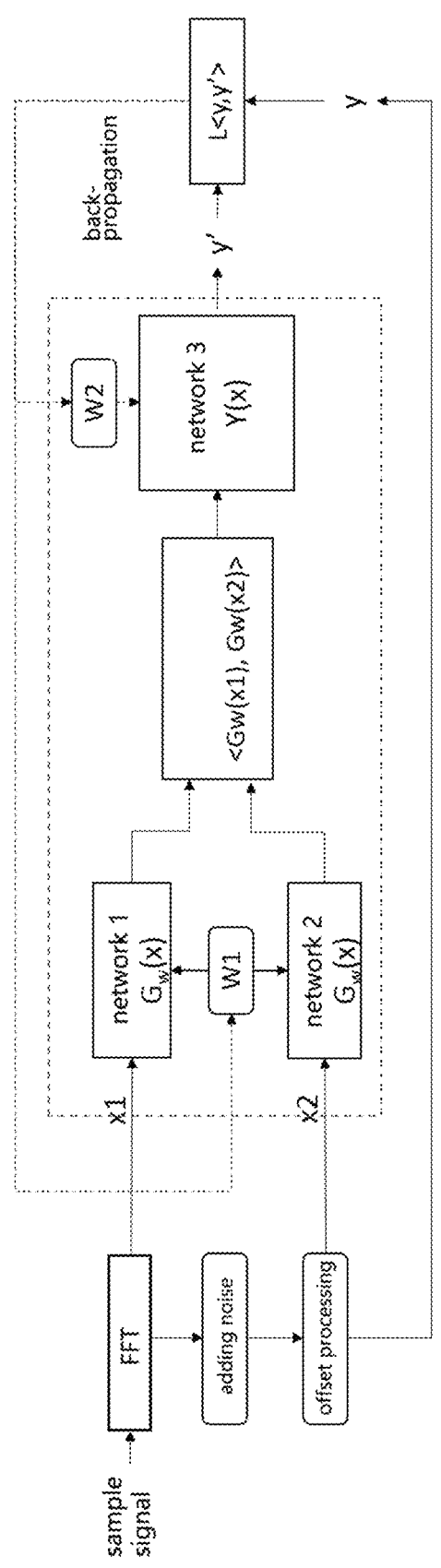
FIG. 3 shows an architecture diagram of a timing offset prediction model according to an embodiment of the present application.

FIG. 3 shows an architecture diagram of a timing offset prediction model according to an embodiment of the present application. As shown in FIG. 3, in the training phase, a first frequency domain image x1 is generated for a sample signal ("sample") using FFT, and then noise is added to x1 and offset processing is performed to obtain the second frequency domain image x2, and the shift value y is recorded. Finally, the group of training sample images generated is <x1, x2, y>.

It should be noted that in other embodiments, the order of adding noise and offset processing can be reversed, and can also be performed in parallel.

Then, x1 and x2 are input into the twin neural network (network 1 and network 2) of the timing offset prediction model respectively, and the function $G_w(X)$ realized by network 1 and network 2 is used to obtain the frequency domain features $G_w(x1)$ and $G_w(x2)$ output. The two deep neural networks of the twin neural network share the parameter w1. After that, the two frequency domain features $G_w(x1)$ and $G_w(x2)$ are concatenated (concat operation is performed) to obtain the fused feature concat<$G_w(x1)$, $G_w(x2)$>.

Subsequently, the fused feature is input into the prediction network (Network 3), and the predicted timing offset y' is obtained by using a function Y(X) implemented by Network 3.

A loss function can be preferably mean square error (MSE) loss function, the specific formula is $$L = \frac{1}{n}\sum_{i=0}^{n}(y-y')^2,$$

wherein is the number of samples. And then, through a backpropagation algorithm (BP) combined with a optimization function, the parameter w1 and the parameter w2 of network 3 are optimized. The optimization function can select stochastic gradient descent (SGD), batch gradient descent (BGD) and so on. After multiple iterations, the parameters are in a stable state, and the timing offset prediction model converges.

When using the timing offset prediction model which has been trained, it is only necessary to omit the step of parameter optimization and the step of generating the second frequency domain image (because one frequency domain image can be generated directly from an audio signal to be aligned).

For example, the output timing offset is y, and then the audio signal to be aligned is adjusted according to a determined matching point. For example, if a matching point is k, and the shift output y is −3, then the final output matching point is k−3. Wherein, if the audio signal to be aligned has been cut, the matching point needs to be calculated according to the cutting method; otherwise, the initial point of the audio signal to be aligned can be directly selected as the matching point.

An embodiment of the present application further provides a device for timing alignment of audio signals, which is used to implement the method for timing alignment of audio signals described above.

Figure 4:
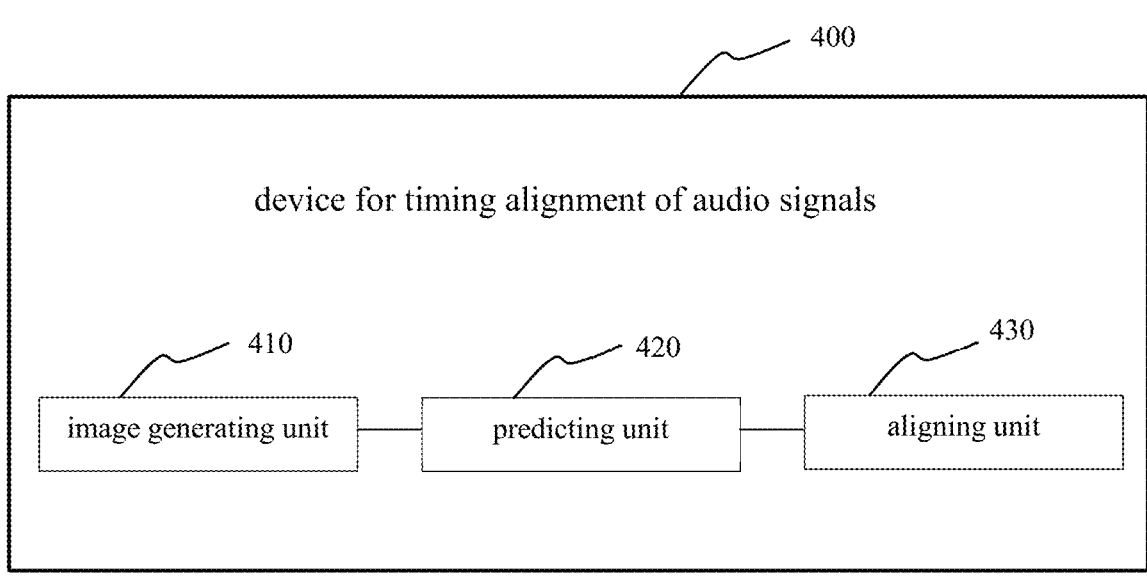
FIG. 4 is a structural diagram of a device for timing alignment of audio signals according to an embodiment of the present application.

Specifically, FIG. 4 is a structural diagram of a device for timing alignment of audio signals according to an embodiment of the present application. As shown in FIG. 4, the device for timing alignment of audio signals 400 includes:

The image generating unit 410 is configured to generate frequency domain images for the audio signal to be aligned and the template audio signal respectively.

The predicting unit 420 is configured to input the frequency domain images into the twin neural network of the timing offset prediction model, to obtain two frequency domain features output by the twin neural network; fuse the two frequency domain features to obtain a fused feature; and input the fused feature into the prediction network of the timing offset prediction model, and obtain the timing offset output by the prediction network.

The aligning unit 430 is configured to perform timing alignment processing on the audio signal to be aligned according to the timing offset.

In some embodiments, in the above-mentioned device, the image generating unit 410 is configured to cut the audio signal to be aligned according to the duration of the template audio signal, so that the duration of the cut audio signal to be aligned equals to the duration of the template audio signal; and generate frequency domain images for the audio signal to be aligned after cutting and the template audio signal respectively.

In some embodiments, in the above-mentioned device, the image generating unit 410 is configured to generate frequency domain images for the audio signal to be aligned and the template audio signal respectively by using a FFT method.

In some embodiments, in the above-mentioned device, the predicting unit 420 is configured to concatenate two frequency domain features to obtain the fused feature. Performing timing alignment processing on the audio signal to be aligned according to the timing offset includes: determining the usage manner of the timing offset according to the order of two frequency domain features during concatenating.

In some embodiments, in the above-mentioned device, the predicting unit 420 is used to perform fully connected processing on the fused feature by a fully connected layer of the prediction network to obtain a fully connected features; perform flattening processing on the fully-connected features by the Flat layer of the prediction network, to obtain the flattened one-dimensional feature; and the output layer of the prediction network outputs the predicted timing offset according to the one-dimensional feature.

In some embodiments, the above-mentioned device further includes a training unit, which is used to train to obtain the timing offset prediction model in the following manner: inputting a group of training sample images into the twin neural network of the timing offset prediction model, to obtain two frequency domain features output by the twin neural network; fusing the two frequency domain features to obtain a fused feature; inputting the fused feature into the prediction network of the timing offset prediction model, and obtaining the timing offset output by the prediction network as a sample predictive value; and calculating a training loss value according to the sample predictive value and the sample actual value of the group of training sample images, and updating the parameters of the twin neural network and the parameters of the prediction network according to the training loss value.

In some embodiments, in the above-mentioned device, the training unit is configured to generate a first frequency domain image of the sample signal; process the first frequency domain image to obtain a second frequency domain image to simulate a signal to be aligned of the sample signal; and the first frequency domain image and the second frequency domain image are used as a group of training sample images to perform online learning and training on the timing offset prediction model.

In some embodiments, in the above-mentioned device, the training unit is configured to perform offset processing on the first frequency domain image, and use the offset used in the offset processing as the sample actual value of the group of training sample images.

In some embodiments, in the above-mentioned device, the training unit is configured to add noise to the first frequency domain image, to simulate noise interference in an actual scene.

It can be understood that the above-mentioned device for timing alignment of audio signals can implement the steps of the method for timing alignment of audio signals performed by a server for timing alignment of audio signals provided in the foregoing embodiments. Relevant explanations about the method for timing alignment of audio signals are also applicable to the device for timing alignment of audio signals, which will be omitted here.

Figure 5:
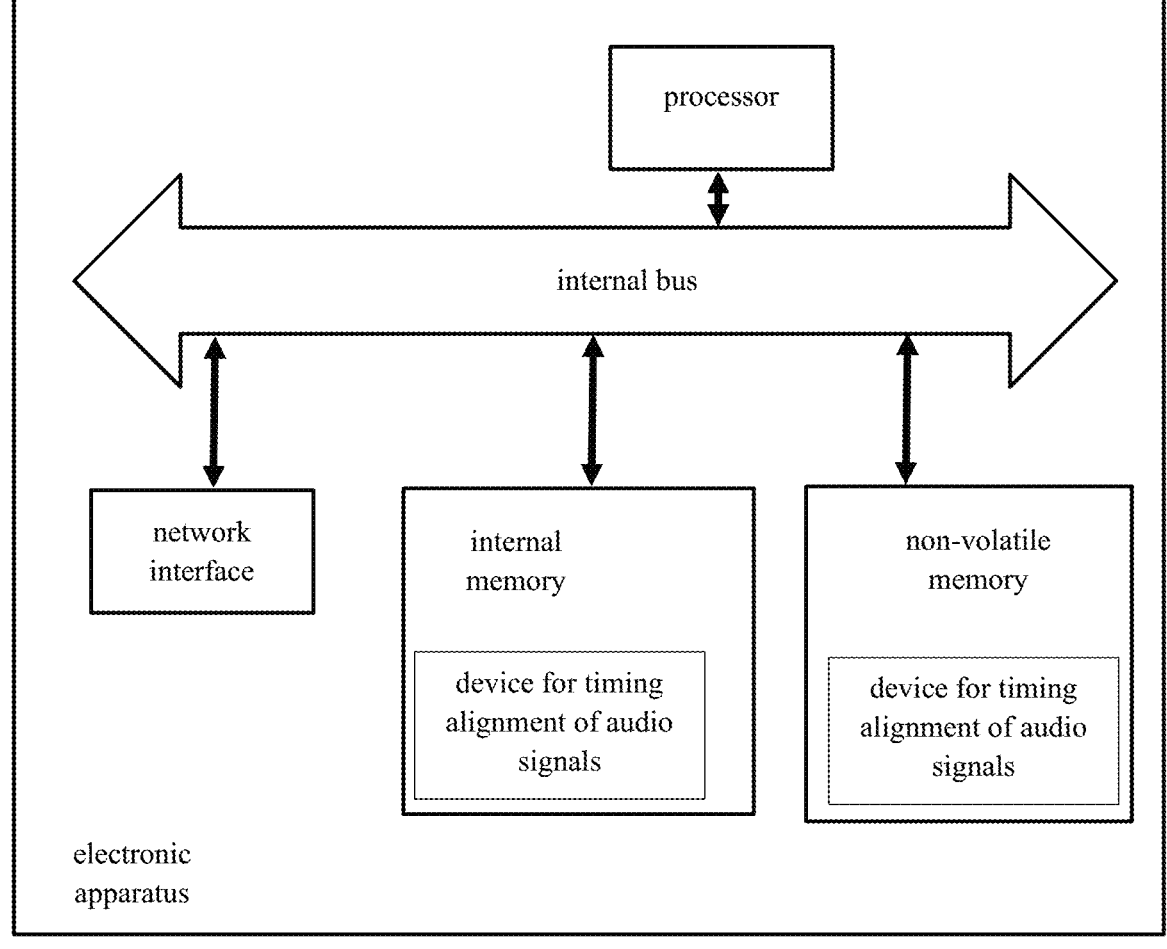
FIG. 5 is a structural diagram of an electronic apparatus according to an embodiment of the present application.

FIG. 5 is a structural diagram of an electronic apparatus according to an embodiment of the present application. Referring to FIG. 5, at a hardware level, the electronic apparatus includes a processor, and optionally also includes an internal bus, a network interface, and a memory. Wherein, the memory may include an internal memory, such as a high-speed random-access memory (RAM), and may also include a non-volatile memory, such as at least one hard disk storage. Of course, the electronic apparatus may also include hardware required by other services.

The processor, the network interface and the memory can be interconnected by internal buses, and the internal buses can be Industry Standard Architecture (ISA) bus, Peripheral Component Interconnect (PCI) bus or Extended Industry Standard Architecture (EISA) bus, etc. The buses can be classified into address bus, data bus, and control bus, etc. For ease of representation, one double-headed arrow indicate a bus in FIG. 5, but it does not mean that there is only one bus or one type of bus.

Memory is used for storing programs. Specifically, the programs may include program codes, and the program codes include computer operation instructions. Memory can include an internal memory and a nonvolatile storage, and provide instructions and data to the processor.

The processor reads corresponding computer program from the non-volatile memory into the internal memory and then runs it, and forms a device for timing alignment of audio signals on a logical level. The processor executes the program stored in the memory, and is specifically used to perform the following operations.

frequency domain images are generated for the audio signal to be aligned and the template audio signal respectively; the frequency domain images are respectively input into the twin neural network of the timing offset prediction model, to obtain two frequency domain features output by the twin neural network; the domain features are fused to obtain the fused feature; the fused feature is input into the prediction network of the timing offset prediction model, to obtain the timing offset output by the prediction network; and timing alignment is performed on the audio signals to be aligned according to the timing offset.

The above method performed by a device for timing alignment of audio signals disclosed in the embodiment shown in FIG. 1 of the present application may be applied to a processor or implemented by the processor. A processor may be an integrated circuit chip with signal processing capabilities. In the implementation process, each step of the above method can be completed by an integrated logic circuit of hardware in a processor or instructions in the form of software. The above processor can be a general-purpose processor, including a central processing unit (CPU), a network processor (NP), etc. The processor can also be a Digital Signal Processor (DSP), Application Specific Integrated Circuit (ASIC), Field-Programmable Gate Array (FPGA) or other programmable logic devices, discrete gate or transistor logic devices, discrete hardware assembly. The processor can implement or perform various methods, steps, and logic block diagrams disclosed in the embodiments of the present application. A general-purpose processor may be a microprocessor, or the processor may be any conventional processor, or the like. The steps of the method disclosed in connection with the embodiments of the present application may be directly embodied to be implemented by a hardware decoding processor, or implemented by a combination of hardware and software modules in the decoding processor. The software module can be located in a mature storage medium in the field such as random access memory, flash memory, read-only memory, programmable read-only memory or electrically erasable programmable memory, register. The storage medium is located in the memory, and the processor reads information in the memory, and completes the steps of the above method in combination with its hardware.

The electronic apparatus can also execute the method performed by the device for timing alignment of audio signals in FIG. 1, and implement the functions of the device for timing alignment of audio signals in the embodiment shown in FIG. 1, which will not be described repeatedly in the embodiment of the present application.

The embodiment of the present application also provides a computer-readable storage medium. The computer-readable storage medium stores one or more programs, and the one or more programs include instructions. When the instructions are executed by an electronic apparatus including a plurality of applications, the electronic apparatus can perform a method performed by the device for timing alignment of audio signals in the embodiment shown in FIG. 1, and is specifically used to perform:

generating frequency domain images for the audio signal to be aligned and the template audio signal respectively; inputting the frequency domain images respectively into the twin neural network of the timing offset prediction model, to obtain two frequency domain features output by the twin neural network; fusing the domain features to obtain the fused feature; inputting the fused feature into the prediction network of the timing offset prediction model to obtain the timing offset output by the prediction network; and performing timing alignment processing on the audio signals to be aligned according to the timing offset.

Those skilled in the art should understand that the embodiments of the present application may be provided as methods, systems, or computer program products. Accordingly, the present application may take the form of a full hardware embodiment, a full software embodiment, or an embodiment combining software and hardware aspects. Furthermore, the present application may take a form of a computer program product embodied on one or more computer-usable storage media (including but not limited to disk storage, CD-ROM, optical storage, etc.) having computer-usable program codes.

The present application is described with reference to flowcharts and/or block diagrams of the method, apparatus (system), and computer program product according to embodiments of the present application. It should be understood that computer program instructions can implement each procedure and/or block in the flowchart and/or block diagram, and combinations of procedures and/or blocks in the flowchart and/or block diagram. These computer program instructions can be provided to a general-purpose computer, a special-purpose computer, an embedded processor, or processors of other programmable data processing apparatus to produce a machine, such that the instructions executed by the processor of the computer or other programmable data processing apparatus produce a device which is used to implement functions specified in one or more procedures of the flow chart and/or one or more blocks of the block diagram.

These computer program instructions may also be stored in a computer-readable memory capable of directing a computer or other programmable data processing apparatus to operate in a specific manner, such that the instructions stored in the computer-readable memory produce a product having an instruction device, which implements functions specified in one or more procedures of the flow chart and/or one or more blocks of the block diagram.

These computer program instructions can also be loaded to a computer or other programmable data processing apparatus, such that a series of operational steps are performed on the computer or other programmable apparatus to produce a computer-implemented process, thereby the instructions provide steps for implementing functions specified in one or more procedures of the flow chart and/or one or more blocks of the block diagram.

In a typical configuration, a computing apparatus includes one or more processors (CPU), input/output interfaces, network interfaces, and a memory.

The memory may include non-permanent storage in computer readable media, random access memory (RAM) and/or nonvolatile memory such as read only memory (ROM) or flash RAM. The memory is an example of computer readable media.

Computer-readable media includes permanent and non-permanent, removable and non-removable media, and can be implemented by any method or technology for storing information. Information may be computer readable instructions, data structures, program modules or other data. Examples of computer storage media include, but are not limited to, phase change memory (PRAM), static random access memory (SRAM), dynamic random access memory (DRAM), other types of random access memory (RAM), read only memory (ROM), Electrically Erasable Programmable Read-Only Memory (EEPROM), Flash memory or other memory technology, Compact Disc Read-Only Memory (CD-ROM), Digital Versatile Disc (DVD) or other optical storage, magnetic tape cartridge, tape magnetic disk storage or other magnetic storage device or any other non-transmission medium that can be used to store information that can be accessed by a computing apparatus. As defined herein, computer-readable media excludes transitory computer-readable media, such as modulated data signals and carrier waves.

The above descriptions are only examples of the present application, and are not intended to limit the present application. For those skilled in the art, various modifications and changes may occur in the present application. Any modification, equivalent replacement, improvement, etc. made within the spirit and principle of the present application shall be included within the scope of the claims of the present application.

The invention claimed is:

1. A method for timing alignment of audio signals, comprising:

generating frequency domain images respectively for an audio signal to be aligned and a template audio signal;

inputting the frequency domain images into a twin neural network of a timing offset prediction model respectively, to obtain two frequency domain features output by the twin neural network;

fusing the two frequency domain features to obtain a fused feature;

inputting the fused feature into a prediction network of the timing offset prediction model to obtain a timing offset output by the prediction network; and performing timing alignment processing on the audio signal to be aligned according to the timing offset.

2. The method according to claim 1, wherein said "generating frequency domain images respectively for an audio signal to be aligned and a template audio signal" comprises:

cutting the audio signal to be aligned according to a duration of the template audio signal, so that a duration of the audio signal to be aligned after cutting equals to the duration of the template audio signal; and generating frequency domain images respectively for the audio signal to be aligned after cutting and the template audio signal.

3. The method according to claim 1, wherein said "generating frequency domain images respectively for an audio signal to be aligned and a template audio signal" comprises:

generating frequency domain images respectively for the audio signal to be aligned and the template audio signal by using a Fast Fourier Transform method.

4. The method according to claim 1, wherein said "fusing the two frequency domain features to obtain a fused feature" comprises:

concatenating the two frequency domain features to obtain the fused feature; and said "performing timing alignment processing on the audio signal to be aligned according to the timing offset" comprises: determining a way of using the timing offset according to an order of the two frequency domain features during concatenating.

5. The method according to claim 1, wherein said "inputting the fused feature into a prediction network of the timing offset prediction model to obtain a timing offset output by the prediction network" comprises:

performing fully connected processing on the fused feature by a fully-connected layer of the prediction network to obtain a fully connected feature;

performing flattening processing on the fully connected feature by a Flat layer of the prediction network to obtain a flattened one-dimensional feature; and outputting a predicted timing offset by an output layer of the prediction network according to the one-dimensional feature.

6. The method according to claim 1, wherein the timing offset prediction model is obtained by training in the following manner:

inputting a group of training sample images into the twin neural network of the timing offset prediction model, to obtain two frequency domain features output by the twin neural network;

fusing the two frequency domain features to obtain a fused feature;

inputting the fused feature into the prediction network of the timing offset prediction model, to obtain the timing offset output by the prediction network as a sample predictive value; and calculating a training loss value according to the sample predictive value and a sample actual value of the group of training sample images, and updating parameters of the twin neural network and parameters of the prediction network according to the training loss value.

7. The method of claim 6, further comprising:

generating a first frequency domain image of a sample signal;

processing the first frequency domain image to obtain a second frequency domain image to simulate a signal to be aligned of the sample signal; and using the first frequency domain image and the second frequency domain image as a group of training sample images to perform online learning and training on the timing offset prediction model.

8. The method of claim 7, wherein said "processing said first frequency domain image" comprises:

performing offset processing on the first frequency domain image, and an offset used in the offset processing is used as the sample actual value of the group of training sample images.

9. The method of claim 7, wherein said "processing the first frequency domain image" comprises:

adding noise to the first frequency domain image to simulate noise interference in an actual scene.

10. A device for timing alignment of audio signals, comprising:

a processor; and a memory storing computer-executable instructions that, when executed by the processor, cause the processor to:

generate frequency domain images respectively for an audio signal to be aligned and a template audio signal;

input the frequency domain image into a twin neural network of a timing offset prediction model respectively, to obtain two frequency domain features output by the twin neural network; fuse the two frequency domain features to obtain a fused feature; and input the fused feature to a prediction network of the timing offset prediction model to obtain a timing offset output by the prediction network; and perform timing alignment processing on the audio signal to be aligned according to the timing offset.

11. The device of claim 10, wherein the computer-executable instructions, when executed by the processor, cause the processor to:

cut the audio signal to be aligned according to a duration of the template audio signal, so that a duration of the audio signal to be aligned after cutting equals to the duration of the template audio signal; and generate frequency domain images respectively for the audio signal to be aligned after cutting and the template audio signal.

12. The device of claim 10, wherein the computer-executable instructions, when executed by the processor, cause the processor to:

concatenate the two frequency domain features to obtain the fused feature; and perform the timing alignment processing on the audio signal to be aligned according to the timing offset by determining a way of using the timing offset according to an order of the two frequency domain features during concatenating.

13. The device of claim 10, wherein the computer-executable instructions, when executed by the processor, cause the processor to:

perform fully connected processing on the fused feature by a fully connected layer of the prediction network to obtain a fully-connected feature;

perform flattening processing on the fully connected feature by a Flat layer of the prediction network to obtain a flattened one-dimensional feature; and output predicted timing offset by an output layer of the prediction network according to the one-dimensional features.

14. The device of claim 10, wherein the computer-executable instructions, when executed by the processor, further cause the processor to train the timing offset prediction model by:

inputting a group of training sample images into the twin neural network of the timing offset prediction model, to obtain the two frequency domain features output by the twin neural network;

fusing the two frequency domain features to obtain a fused feature;

inputting the fused feature into the prediction network of the timing offset prediction model, to obtain the timing offset output by the prediction network as a sample predictive value; and calculating a training loss value according to the sample predictive value and a sample actual value of the group of training sample images, and updating parameters of the twin neural network and parameters of the prediction network according to the training loss value.

15. A non-transitory computer-readable storage medium, wherein the non-transitory computer-readable storage medium stores one or more programs, and when the one or more programs are executed by an electronic apparatus comprising a plurality of applications, the electronic apparatus executes the following method for timing alignment of audio signals:

generating frequency domain images respectively for an audio signal to be aligned and a template audio signal;

inputting the frequency domain images into a twin neural network of a timing offset prediction model respectively, to obtain two frequency domain features output by the twin neural network;

fusing the two frequency domain features to obtain a fused feature;

inputting the fused feature into a prediction network of the timing offset prediction model to obtain a timing offset output by the prediction network; and performing timing alignment processing on the audio signal to be aligned according to the timing offset.

* * * * *